United States Patent
Bartolucci et al.

(10) Patent No.: US 8,940,349 B2
(45) Date of Patent: Jan. 27, 2015

(54) PROCESS AND APPARATUS FOR PRODUCING BAKERY PRODUCTS IN THE FORM OF HALF-SHELLS

(75) Inventors: Enrico Bartolucci, Castino (IT); Rino Durio, Piobesi d'Alba (IT)

(73) Assignee: Soremartec S.A., Findel (LU)

( * ) Notice: Subject to any disclaimer, the term of this patent is extended or adjusted under 35 U.S.C. 154(b) by 151 days.

(21) Appl. No.: 13/513,355

(22) PCT Filed: Dec. 2, 2010

(86) PCT No.: PCT/IB2010/055548
§ 371 (c)(1),
(2), (4) Date: Jun. 1, 2012

(87) PCT Pub. No.: WO2011/067733
PCT Pub. Date: Jun. 9, 2011

(65) Prior Publication Data
US 2012/0244250 A1 Sep. 27, 2012

(30) Foreign Application Priority Data
Dec. 3, 2009 (IT) .............................. TO2009A0952

(51) Int. Cl.
*B28B 7/16* (2006.01)
*A21D 13/00* (2006.01)
(Continued)

(52) U.S. Cl.
CPC ................ *A21D 13/008* (2013.01); *A21B 5/02* (2013.01); *A21C 11/006* (2013.01); *A21D 8/06* (2013.01); *A21D 13/0035* (2013.01); *Y10S 249/01* (2013.01)
USPC ............... 426/512; 426/94; 426/138; 249/52; 249/144; 249/160; 249/168; 249/DIG. 1; 425/292; 425/298; 425/346

(58) Field of Classification Search
USPC .............. 426/512, 94, 138; 249/52, 144, 160, 249/163, 168, DIG. 1; 425/292, 298, 346
See application file for complete search history.

(56) References Cited

U.S. PATENT DOCUMENTS

| | | | | | |
|---|---|---|---|---|---|
| 4,812,323 | A | * | 3/1989 | Savage | ........................ 426/496 |
| 6,973,872 | B2 | * | 12/2005 | Morgan | ........................ 99/439 |

(Continued)

FOREIGN PATENT DOCUMENTS

| EP | 0054229 A2 | 6/1982 |
|---|---|---|
| EP | 0221033 A2 | 5/1987 |

(Continued)

*Primary Examiner* — Lien T Tran
(74) *Attorney, Agent, or Firm* — Rothwell, Figg, Ernst & Manbeck, P.C.

(57) ABSTRACT

In a process for producing half-shells (2) which are made from a dough for bakery products and are characterized by an annular orifice rim (6) with a finished surface, by producing a wafer sheet (1) comprising a plurality of half-shells (2) connected to one another by an interconnecting wall (4), by forming and baking said dough in a mold with the use of a mold formed by two complementary plates (12, 14) having respective front surfaces which, as a result of the fitting together of the two plates, can define a forming cavity having a shape generally corresponding to that of said wafer sheet (1), a mold is used wherein the front forming surface of at least one of said plates has shaped portions (26) which project towards the front surface of the other plate (12) and which can define, in the dough that is subjected to baking in the forming cavity, a notch (24) in the interconnecting wall (4) adjacent each half-shell (2), wherein the plates can be fitted together in an initial position in which the forming cavity has a volume smaller than the volume of the wafer sheet to be obtained, the dough is subjected to a first, partial baking step in the forming cavity with the molds fitted together in the initial position, while the volume of the forming cavity is kept constant until the dough is partially solidified, the dough is then subjected to finishing baking with an increase in the volume of the forming cavity, in order to obtain a wafer sheet (1) wherein the half-shells (2) are connected to the interconnecting wall (4) by an annular region (28) having a thickness which is substantially less than the thickness of the interconnecting wall (4); the half-shells can thus be separated from the wafer sheet by a slight pressure exerted in a direction perpendicular to the plane of the wafer sheet.

17 Claims, 2 Drawing Sheets

(51) Int. Cl.
  *A21B 5/02* (2006.01)
  *A21C 11/00* (2006.01)
  *A21D 8/06* (2006.01)

(56) References Cited

U.S. PATENT DOCUMENTS 7,404,978 B2 * 7/2008 Mansuino ................ 426/94
7,998,516 B2 * 8/2011 Brandt ................ 426/505

FOREIGN PATENT DOCUMENTS

| EP | 0968653 A1 | 1/2000 |
| EP | 1433384 A1 | 6/2004 |
| EP | 1647190 A1 | 4/2006 |
| EP | 1967069 A1 | 9/2008 |
| GB | 465242 | 5/1937 |
| WO | 9748282 A1 | 12/1997 |

* cited by examiner

PROCESS AND APPARATUS FOR PRODUCING BAKERY PRODUCTS IN THE FORM OF HALF-SHELLS

CROSS REFERENCE TO RELATED APPLICATION(S)

This application is a 35 U.S.C. §371 National Phase Entry Application from PCT/IB2010/055548 filed Dec. 2, 2010, designating the United States and claiming priority to Italian Application No.: TO2009A000952 filed Dec. 3, 2009, the disclosures of which are incorporated by reference herein in their entirety.

The present invention relates to the production of hollow bodies, hereinafter referred to as half-shells, made from a dough for bakery products such as, for example, a wafer batter, a bread-making dough, or the like.

In particular, the invention is directed towards the production, by an industrial process, of half-shells which have a containing wall and an annular orifice rim having a smooth skin-like surface, substantially free of macropores, such as results, for example, from the baking of the wafer batter in contact with the polished surfaces of the half-moulds that are used for the forming and baking of the products.

The above-mentioned annular orifice surface will be referred to below by the term "finished rim", in particular to distinguish its degree of finishing from that of a surface resulting from the cutting of the wall of a wafer sheet which, in contrast, owing to the porous internal structure of the wafer, has a macroporous and/or crumbled, open-cell surface.

The wafer half-shells to which the invention relates are used in the food industry to produce closed, hollow bodies which generally include a filling and are produced by the joining together of two half-shells along their respective meeting orifice surfaces, or by the joining of a single half-shell to a flat wall. The products concerned are, in general, products of various sizes and shapes, for example, spherical, ovoid, bar-like, double truncated pyramidal, or multi-celled shapes; however, the most frequent application relates to the production of small products which can be eaten in a single mouthful.

Various patent documents describe techniques for producing half-shells of the above-mentioned type. These techniques have in common the production of a wafer sheet comprising a plurality of half-shells, which are generally arranged in an array or matrix and are connected to one another by an interconnecting wall (also known as a "frame"), by the forming and baking of the dough or batter in a mould and the separation of the half-shells from the interconnecting wall by a cutting operation.

The cutting operation may be performed in a plane parallel to the interconnecting wall, for example, in accordance with the processes described in EP-A-0 054 229, WO-A-97/48282, EP-A-0 221 033, P-A-0 968 653 and EP-A-1 967 069; in this case, however, the half-shells obtained do not have a finished orifice rim but a surface which does not have any surface finishing and has a rough and porous structure in which the internal porous structure of the wafer is exposed to the exterior.

However, the production of shells with finished rims is particularly desirable with regard to the production of filled hollow products that include a fluid filling since the presence of meeting surfaces with finished rims reduces the risk of leakage of the fluid. Moreover, the production of half-shells with finished rims is advantageous with regard to the process of welding of the half-shells by moistening of the meeting rims, which is described in EP-A-1 647 190.

In this case, the presence of a finished rim increases the contact area, permitting adequate adhesion without the need to apply high pressures to promote contact.

EP-A-1 433 384 describes a process for producing half-shells with finished rims by the preparation, by forming and baking in a mould, of a wafer sheet in which the interconnecting wall between the half-shells is connected to the half-shells in a position below the annular orifice rim; the half-shells thus have a finished rim resulting from the forming and they can be separated from the interconnecting wall by means of a cutting action which is generally performed by punching in a direction perpendicular to the interconnecting wall, without interfering with or damaging the orifice rim.

Although the above-mentioned process is advantageous, its main drawback is that the half-shells obtained have an annular porous region in their side walls in a position below the orifice rim, which results from the punching operation. This aspect does not constitute a disadvantage when an edible coating is to be applied to the outer surface of the half-shells, hiding the porous region, but it may be a drawback, particularly from the aesthetic point of view, with regard to the production of non-coated products in which the outer surface of the half-shell is visible.

A first objective of the present invention is to provide a process which enables a half-shell with a finished rim to be produced whilst overcoming the above-mentioned drawback, that is, a process which enables a half-shell to be produced in which not only the annular orifice rim but also the entire outer surface of the containing wall have substantially the same degree of smooth and polished finish, being free of regions with porous, crumbled and/or rough surfaces.

Another objective of the invention is to provide a process which renders the separation of the half-shells from the interconnecting wall particularly easy whilst complying with the above-mentioned aim.

Another objective of the invention is to provide a process which enables half-shells to be produced which have the above-mentioned features and which have suitable morphology, particularly with regard to their internal porosity, both starting with a wafer batter and starting with bread-making dough or the like.

In view of these objectives, the subject of the invention is a process and a moulding apparatus or plate having the features defined in the appended claims, the content of which is incorporated herein by reference.

A further subject of the invention is a wafer sheet which can be obtained as an intermediate product of the process and from which the half-shells with finished rims can easily be separated.

Further features and advantages of the process and of the moulding apparatus of the invention will become clear from the following detailed description which is given with reference to the appended drawings, provided by way of non-limiting example, in which.

Figure 1:
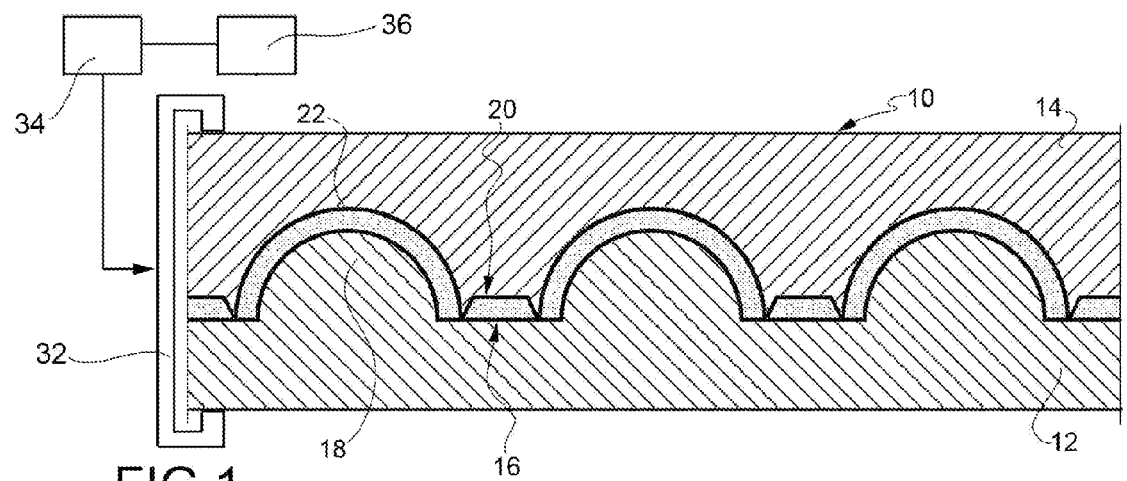
FIG. 1 is a section through a portion of a mould used in the process according to the invention, in an initial configuration of the process.

The following description relates, by way of example, to the production of substantially hemispherical half-shells although, as already indicated, the process is applicable in general to half-shells of any shape and size.

The process according to the invention includes the production, by way of an intermediate product, of a wafer sheet 1 which, in accordance with the prior art, comprises a plurality of half-shells 2 which are arranged in an array or matrix and are connected to one another by an interconnecting wall 4 which is normally flat. All of the half-shells extend from one side of the interconnecting wall 4 and, in the process according to the invention, the annular surface which constitutes the annular orifice rim 6 of each half-shell is preferably flush with one of the two surfaces of the interconnecting wall 4.

The term "wafer sheet" is used in the present description to indicate a shaped sheet resulting from the forming and baking of a dough for bakery products but is not intended to be limiting with regard to the nature of the ingredients used for the dough; in fact, it may be, for example, a wafer sheet obtained from a conventional wafer batter but also a bread wafer sheet produced by the forming and baking of a rolled sheet of leavened bread dough.

Further features relating to the nature of the materials used for the production of the wafer sheet will be given in the following description.

Naturally, the situation in which the above-mentioned wafer sheet has half-shells having various shapes, for example, with an area including a matrix of half-shells having a first shape and a second area having a matrix of half-shells with a different shape falls within the scope of the process according to the invention, as does the situation in which the interconnecting wall 4 has a thickness which is differentiated with respect to the thickness of the walls of the half-shells, in particular a greater wall thickness, in accordance with the process and the respective mould described in WO97/48282, in which the solution of differentiated thickness is intended to facilitate the removal of the wafer sheet from the mould.

A mould 10 is used for the forming and baking of the wafer sheet and comprises two plates or half-moulds 12, 14, the front surfaces of which can define a forming cavity having a shape corresponding to that of the above-mentioned wafer sheet.

The plate 12 (or male plate) thus has a front surface including a substantially flat surface 16 which defines one of the two surfaces of the interconnecting wall 4 and a plurality of protuberances 18; the other plate 14 (or female plate) correspondingly has a front surface with a substantially flat surface 20 which defines the other surface of the interconnecting wall and a plurality of recesses 22 which, together with the surfaces of the protuberances 18, define the cavity for the forming of the half-shells 2.

According to a feature of the invention, the front surface of at least one of the two plates 12 or 14, in particular of the female plate 14, has shaped portions 26 which project towards the front surface of the other plate. These projecting portions 26 are of annular shape and surround each recess 22 of the plate 14, preferably having, in cross-section perpendicular to the plane of the front surface of the plate, a V-shape or a tooth-like shape, preferably with a sharpened end. The projecting portions 26 can thus define, in the dough which is subjected to forming and baking in the mould, an annular notch 24 in the interconnecting wall 4 adjacent each half-shell.

In the process according to the invention, the two complementary plates 12 and 14 are fitted together so that the ends of the projecting portions 26 are substantially flush with or in contact with the flat front surface of the other plate; to prevent damage to the ends of the projecting portions as a result of repeated fitting-together of the plates, spacer elements may be provided in the plates to maintain a very small distance between the ends of the projecting portions and the front surface of the other plate.

In any case, in the initial configuration, the cavities defining the interconnecting walls 4 are separated from the cavities defining the half-shells 2, or are in communication with the cavities defining the half-shells by means of a passageway 28 having a narrow aperture which in any case is substantially less than the thickness of the cavity defining the interconnecting wall 4.

In one embodiment, the two plates 12 and 14 are coupled one to the other so as to define a forming cavity having a volume corresponding to the volume of the wafer sheet to be obtained.

According to another embodiment, in the initial step of the process according to the invention, the two plates 12 and 14 are fitted together in a configuration such that the forming cavity defined thereby has a volume which is smaller than the volume of the wafer sheet to be obtained (FIG. 1) and, in particular, a thickness which is less than the thickness of the wafer sheet to be obtained.

Figure 2:
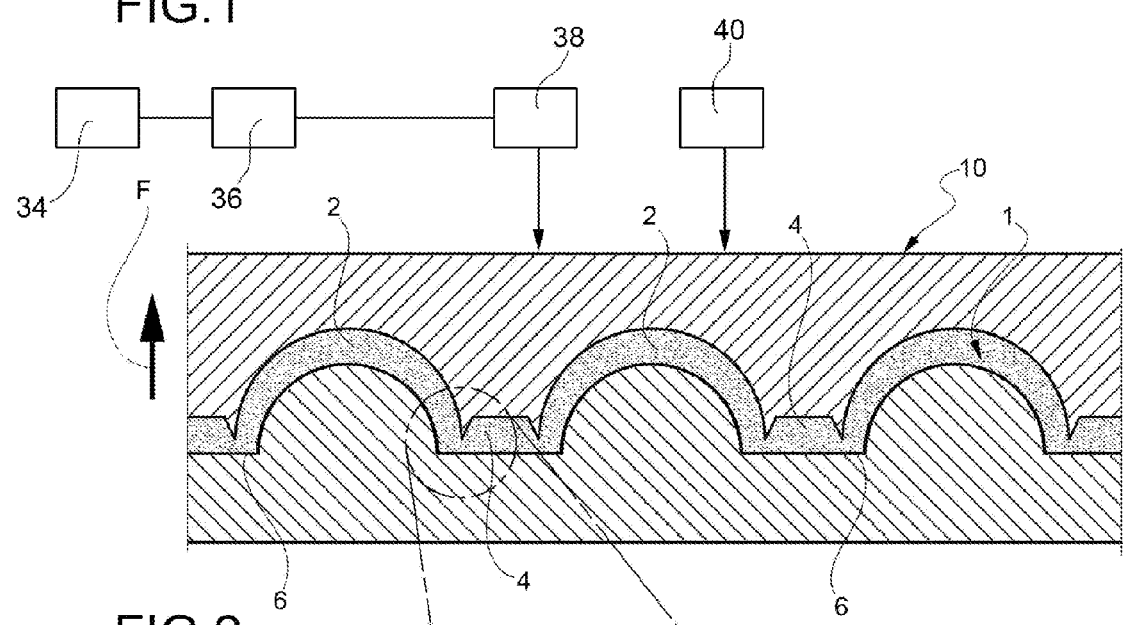
FIG. 2 is a section through the mould of FIG. 1, in the final configuration of the process.
Figure 3:
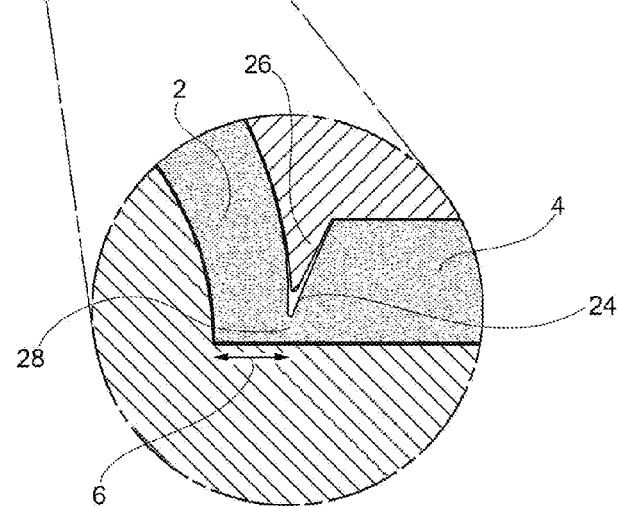
FIG. 3 shows a detail of the mould of FIG. 2, on an enlarged scale.
Figure 4:
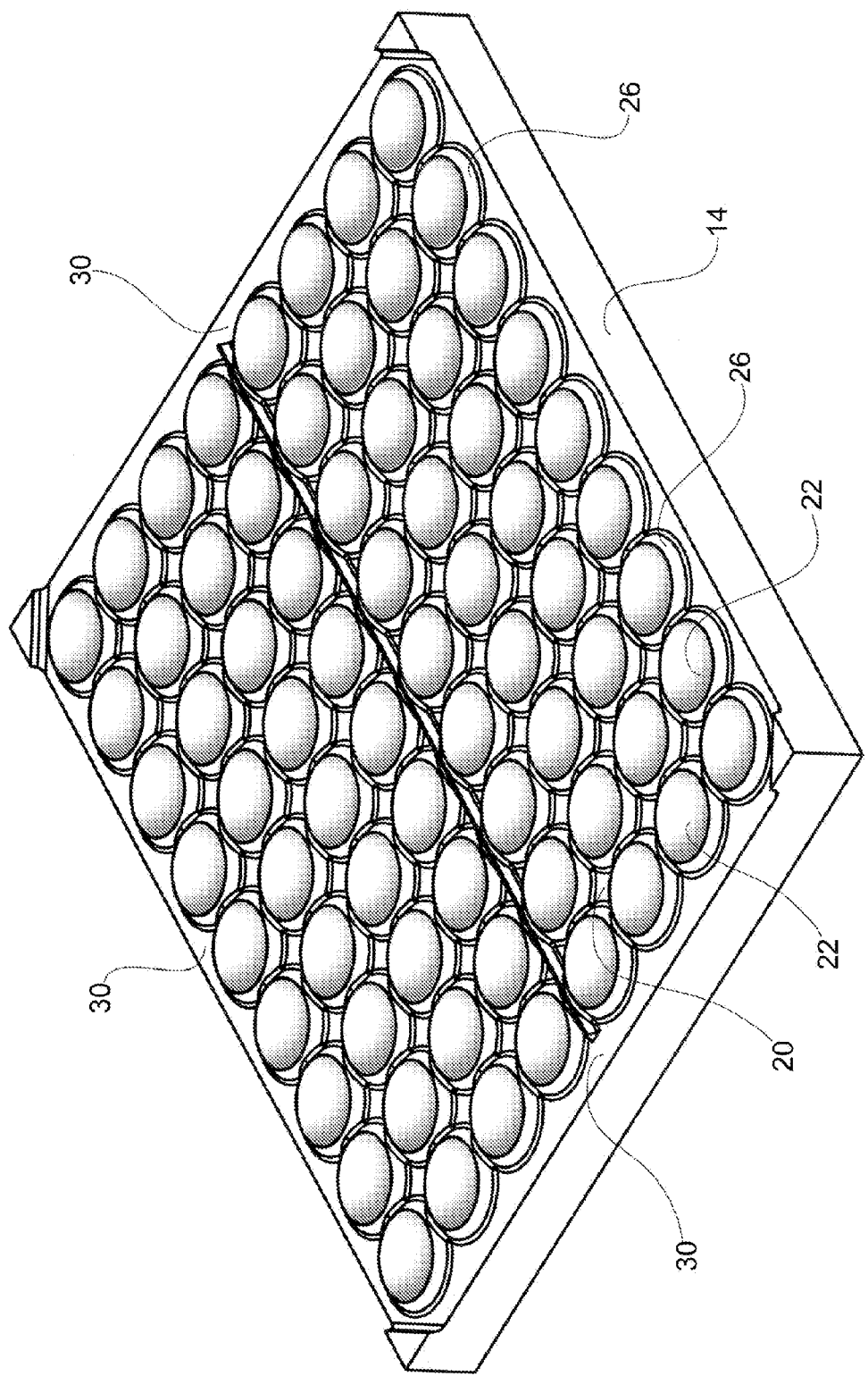
FIG. 4 is a perspective view of a part (a female half-mould) of the mould of FIGS. 1 and 2.

In this second embodiment, the plates 12 and 14 of the mould can translate relative to one another in a direction perpendicular to the general plane defined by their front surfaces (arrow F in FIG. 2) and can thus subsequently adopt a position in which the forming cavity has a volume substantially corresponding to the volume of the final wafer sheet to be obtained (FIG. 2).

The edible composition used for the production of the wafer sheet is a composition which can expand (increase in volume) as a result of baking. It may be a fluid composition which can be pumped such as a wafer batter, or a bread-making dough, preferably pre-processed into the form of a sheet in the plastic state.

The wafer batter may contain, in addition to flour and water, one or more ingredients selected from fats and/or oil, lecithin and/or other emulsifiers, sugar, whole eggs, salt, sodium bicarbonate, ammonium (bi)carbonate, skimmed milk powder, soya flour, raising agents and/or enzymes.

Typically, the water content in a batter is greater than 100 parts by weight of water per 100 parts by weight of flour and is generally between 100 and 180 parts of water per 100 parts of flour.

Bread-making dough on the other hand is characterized by a water content which is typically between 40 and 75 parts by weight of water per 100 parts by weight of flour and typically includes natural yeasts.

However, the presence of raising agents (chemical or natural) in the batter or in the bread-making dough is not an essential requirement for the purposes of the process of the invention.

When a batter is used, it is poured in the fluid state, typically onto the male mould plate, in a predetermined quantity such as to cover the front surface of the plate.

With a bread-making dough, after an optional raising period, the dough is rolled to produce a sheet which is positioned between the two plates of the mould.

In the first embodiment, the dough is subjected to complete baking in the forming cavity, while maintaining constant the volume of the forming cavity.

In the second above-mentioned embodiment, the two plates 12 and 14 are fitted together in the initial forming and baking position (FIG. 1) in which, as indicated above, they define a forming cavity having a volume smaller than the volume of the final wafer sheet to be produced. The dough is subjected to a first, partial baking step whilst the volume of the forming cavity is kept constant until the dough constituting the wafer sheet is partially solidified, and then to a second baking step to achieve complete baking with a change of volume of the forming cavity.

During this first step, partial baking is performed under a pressure which is produced by the development of steam or by the expanding agents contained in the dough. During this step, the cell cavities defining the half-shells are closed or are in communication with the cavity defining the interconnecting wall by means of a narrow throat or passageway, as indicated above.

The cavity defining the interconnecting wall may, however, be in communication with the exterior through openings 30 between the plates in the region of the side edges of the plates.

In any case, the first constant-volume, partial baking step ends when, in view of its content of water and/or other expanding agents, the dough is still capable of further expansion as a result of further baking.

A second baking step is then performed until baking is finished, with an increase in the volume of the forming cavity, that is, by permitting relative translation of the mould plates as a result of the expansion of the dough.

The second, finishing baking step is thus performed substantially in the absence of pressure or, more precisely, in conditions in which the pressure produced in the forming cavity by the development of steam and/or expansion gas from the dough, which can escape from the forming cavity through some openings 30 between the side edges of the plates, is instantaneously balanced by the weight of the plate which bears on the other plate and/or optionally by the pressure produced by optional resilient pressure means which are associated with the mould and oppose relative translation of the plates (or of the movable plate) in order to keep the plate constantly in contact with the dough being baked.

This second baking step, which leads to the solidification of the wafer sheet in the desired shape and with the desired porosity, results in the formation or solidification, in the region of the notch 24, of a thin annular bridge 28 which connects each half-shell 2 to the interconnecting wall 4. Thus, even though upon completion of the first, partial baking step the half-shells 2 are separated from the interconnecting wall 4 by the notch 24 or are connected to that wall by an extremely thin film which in any case would not permit extraction of the wafer sheet from the mould with the half-shells connected to the interconnecting wall, the further baking step without pressure allows the starch molecules that are present adjacent the notch to join together in a small layer by virtue of the presence of sufficient water content for solidification and cohesion.

The wafer sheet that is obtained as a result of the process thus has a plurality of half shells which are connected to the interconnecting wall by the above-mentioned thin layer or annular bridge 28 and also has the desired morphology in terms of porosity and specific volume.

Different solutions may be adopted for performing the above-mentioned two consecutive partial and finishing baking steps.

In a first solution, fastening means 32 may be associated with the two plates of the mould; the fastening means 32 restrain the plates in the initial position and can be released to permit relative translation of the plates with an increase in the volume of the forming cavity in the subsequent step; in this solution, the weight of the plate which bears on the other plate may be determined in a manner such that the pressure produced by the weight of the plate is less, instantaneously, than the pressure produced by the expansion of the dough in the final baking step.

In industrial implementation, actuator means 34 may be associated with the mould for bringing about the release of the fastening means, and may optionally be associated with a control and drive unit 36 which drives the actuator means in order to bring about the release of the fastening means after a predetermined initial baking period.

Alternatively, without the use of plate fastening means, pressure means 38 (for example, resilient means or an additional weight) may be associated with the two plates; the pressure means 38 are active during the partial baking step so as to keep the volume of the forming cavity constant and can be deactivated to initiate the baking step without pressure; in this case as well, the weight of the upper plate may be determined so as to permit relative translation of the plate, with an increase in the volume of the forming cavity, as a result of the deactivation of the pressure means. In this case as well, actuator means 34, optionally associated with a control and operating unit 36, may be present and arranged to deactivate the pressure means after a predetermined initial baking period.

Resilient pressure means 40 may be associated with the plates (in particular with the movable plate) and may be kept active and calibrated in the course of the baking to oppose the relative translation of the plates and ensure constant contact of the plates with the dough during expansion.

The half-shells can easily be separated from the wafer sheet produced by the process according to the invention by means of a simple pressing action perpendicular to the interconnecting plate, without the need to apply a cutting or sawing action. For this purpose, the solidified wafer can be removed from the mould and positioned on a support which has cells and which supports the half-shells, or on a support which supports the interconnecting wall, thus separating the half-shells by means of a pressure exerted on the half-shells or on the interconnecting wall, respectively.

Alternatively, the separation may be performed in the female plate of the mould without removing the wafer beforehand, thus obtaining the half-shells housed in the individual forming cavities.

The baking is performed at conventional temperatures, typically of between 150° C. and 250° C., with total baking times determined in dependence on the composition of the dough. In particular, the durations of the partial baking step and of the total baking stage depend on the water content of the dough; typically, the partial baking step constitutes from 10% to 30% of the total baking time to which the dough must be subjected to achieve finished baking.

The half-shells obtained by means of the process according to the invention have a finished surface substantially over their entire walls as well as on the rim surface since the baking is performed with the dough in contact with the polished surfaces of the two plates; since the annular bridge 28 which connects the half-shells to the interconnecting wall is extremely thin, the outer peripheral edge of the annular orifice surface of each half-shell is free of crumbling after the separation of the half-shells, in fact having a clean and finished profile.

Moreover, the half-shells have a suitable porous internal structure even better than the internal structure which can be obtained by conventional processes.

The invention thus provides a process and apparatus for the implementation thereof which permit the production of shells with finished rims, with suitable porous internal structure, avoiding the need to perform the forming and baking of the half-shells in individual mould cavities and at the same time providing a wafer sheet which renders the production and separation of the individual half-shells from the interconnecting wall particularly easy.

The process according to the invention in fact produces an intermediate wafer structure which can easily be removed from the mould and in which the half-shells are connected to the interconnecting wall by an extremely thin annular bridge that can be broken without a cutting action, which feature cannot be achieved by means of a conventional forming and baking process (that is, static under pressure or dynamic without pressure), nevertheless achieving suitable and improved porosity of the half-shells.

Naturally, the principle of the invention remaining the same, the details of implementation and forms of embodiment may be varied widely with respect to those described by way of non-limiting example, without departing from the scope of the appended claims.

The invention claimed is:

1. A process for producing half-shells from a wafer sheet comprising a plurality of half-shells connected to one another by an interconnecting wall, said half-shells are made from a dough for bakery products and are characterised by an annular orifice rim with a finished surface, the process comprising the steps of:
    placing said dough in a mould formed by two complementary plates having respective front forming surfaces which, as a result of a fitting together of the two plates, define a volume for a forming cavity, said forming cavity having a shape generally corresponding to that of said wafer sheet, wherein, in said mould
    the front forming surface of at least one of said plates has shaped portions which project towards the front surface of the other plate and which define, in the dough that is subjected to baking in said forming cavity, a notch in said interconnecting wall adjacent each half-shell,
    subjecting said dough to baking in said forming cavity, with said moulding plates fitted together, whilst keeping the volume of said forming cavity constant to produce said wafer sheet comprising the plurality of half shells connected to one another by said interconnecting wall, and
    separating the half-shells from the interconnecting wall.

2. A process according to claim 1, characterised in that it comprises the steps of:
    subjecting said dough to a first partial baking step in said forming cavity, with said moulding plates fitted together in a first position, wherein said forming cavity has a volume reduced with respect to the volume of the wafer sheet to be obtained, whilst keeping the volume of said forming cavity constant until the dough is partially solidified,
    then subjecting said dough to finishing baking with an increase in the volume of the said forming cavity, to obtain a wafer sheet wherein said half-shells are connected to said interconnecting wall by an annular region having a thickness which is substantially reduced with respect to the thickness of said interconnecting wall.

3. A process according to claim 2, characterised in that the plates of said mould are capable of relative translation in a direction orthogonal to the general plane of their front surfaces from an initial position to a final position wherein said forming cavity has a volume substantially corresponding to the volume of the final wafer sheet to be obtained, and wherein said translation from the initial position to the final position is allowed or actuated in the finishing baking step.

4. A process according to claim 2, characterised in that said finishing baking step, with an increase in the volume of the forming cavity, is carried out when the dough is capable of further expansion during baking.

5. A process according to claim 2, characterised in that said partial baking step, with constant volume, is carried out for a period of time of between 10 and 30% of the total dough baking time.

6. A process according to claim 1, characterised in that said dough is a fluid wafer batter or a rolled sheet made from a bread-making dough.

7. A process according to claim 6, wherein said wafer batter has a water content of from 100 to 180 parts by weight per 100 parts of flour.

8. A process according to claim 6, characterised in that said bread-making dough comprises from 40 to 75 parts by weight of water per 100 parts of flour and further comprises natural yeasts.

9. A process according to claim 1, characterised in that, in an initial position, said projecting shaped portions extend substantially flush with or in contact with the front surface of the other plate.

10. A process according to claim 1, characterised in that said projecting shaped portions (26) are annular shaped portions having a V-shape or a tooth-like shaped cross-section.

11. A process according to claim 2, characterised in that pressure means or fastening means are associated with said mould and keep said mould in an initial position in said first, partial baking step, said pressure means or fastening means being capable of being deactivated or disengaged, respectively, to allow the increase in the volume of said forming cavity in said finishing baking step, and wherein the weight of the plate which bears on the other plate is determined so that, after deactivation of said pressure means or after disengagement of said fastening means, translation of said half-mould, as the result of the expansion of the dough is allowed in said finishing baking step.

12. A process according to claim 1, characterised in that said step of separating the half-shells from the interconnecting wall is carried out by means of a pressing action exerted on said interconnecting wall or on said half-shells in a direction orthogonal to the plane of said interconnecting wall.

13. A mould for producing a shaped wafer sheet which is made of dough for bakery products that is subjected to baking in said mould, and which comprises a plurality of half-shells connected to one another by an interconnecting wall, wherein said mould comprises two complementary plates with respective front surfaces which, as a result of the fitting together of said plates, define a forming cavity having a shape generally corresponding to that of said wafer sheet, characterised in that the front forming surface of at least one of said plates has shaped portions which project towards the front surface of the other plate and which define in the dough that is subjected to baking in said forming cavity a notch in said interconnecting wall adjacent each half-shell.

14. A mould according to claim 13, characterised in that said plates are capable of translation relative to one another from an initial position wherein said plates define a forming cavity with reduced volume, to a final position wherein they define a forming cavity having a volume larger than the volume of said initial forming cavity.

15. A mould according to claim 14, characterised in that it comprises fastening means for restraining said plates in said initial forming and baking position and actuator means, optionally associated with a control and drive unit, arranged to disengage said fastening means after a predetermined baking time.

16. A mould according to claim 14, characterised in that it comprises pressure means for restraining said plates in said initial forming and baking position and actuator means, optionally associated with a control and drive unit, and arranged to deactivate said pressure means, so as to allow translation of said plates relative to one another, after a predetermined baking time.

17. A mould according to claim 14, characterised in that said projecting shaped portions are annular shaped portions formed in the female plate and having a V-shaped or tooth-like cross-section, wherein the two plates can be fitted together with said shaped portions projecting to as to lie flush with or in contact with the front surface of the other plate, and wherein said mould optionally comprises resilient pressure means suitable for opposing relative translation of said plates.

\* \* \* \* \*